United States Patent [19]

Neely, Jr. et al.

[11] 4,312,844

[45] Jan. 26, 1982

[54] TRIMETAPHOSPHATE COMPOUNDS OF TRIVALENT METALS

[75] Inventors: James E. Neely, Jr., Butler; Charlene A. Falleroni, Lower Burrell; Annette Moff, Latrobe; Chia-Cheng Lin, Gibsonia, all of Pa.

[73] Assignee: PPG Industries, Inc., Pittsburgh, Pa.

[21] Appl. No.: 210,508

[22] Filed: Nov. 26, 1980

[51] Int. Cl.³ .............................................. C01B 25/44
[52] U.S. Cl. ..................................................... 423/314
[58] Field of Search ......................................... 423/314

[56] References Cited

U.S. PATENT DOCUMENTS

| | | | |
|---|---|---|---|
| 2,266,486 | 12/1941 | Booth | 423/314 |
| 4,059,669 | 11/1977 | Thomas | 423/314 |
| 4,216,190 | 8/1980 | Neely, Jr. | 423/314 |

OTHER PUBLICATIONS d'Yvoire, Study of Trivalent Aluminum and Iron Phosphates V. Long Chain Phosphates and the Metaphosphates, Bulletin of the Societe, Chemique de France, No. 6, pp. 1237-1243, (Jun., 1962).

Tsuhako et al., "Studies of the Preparation and Physical Properties of Multivalent Metal Condensed Phosphates", Bulletin of the Chemical Society of Japan, vol. 46, pp. 2343-2346, Aug., 1973.

*Primary Examiner*—O. R. Vertiz
*Assistant Examiner*—Wayne A. Langel
*Attorney, Agent, or Firm*—Donna L. Seidel

[57] ABSTRACT

A method for preparing a trimetaphosphate of a trivalent species by heating a mixture of ammonium phosphate and an oxygen-containing compound of the trivalent species is disclosed.

6 Claims, No Drawings

TRIMETAPHOSPHATE COMPOUNDS OF TRIVALENT METALS

BACKGROUND OF THE INVENTION

1. Field of the Invention

The present invention relates generally to the art of making $M(PO_3)_3$ and more particularly to the preparation of the trimetaphosphates of iron and chromium.

2. The Prior Art

U.S. Pat. No. 4,216,190 to Neely teaches a method for preparing predominantly the B-form of aluminum trimetaphosphate by the addition of ammonia to a solution of aluminum dihydrogen phosphate, $Al(H_2PO_4)_3$. A white precipitate is formed, which is directly converted to B-form of aluminum trimetaphosphate, $Al(PO_3)_3$, by a single elevated temperature treatment.

In a study of the effects of grinding on the structure and properties of various aluminum phosphates, Tsuhako et al report mixing α-alumina and ammonium dihydrogen phosphate, and heating at 500° to 550° C. for 20 hours to obtain the B-form of $Al_4(P_4O_{12})_3$.

3. The Present Invention

The present invention provides a simple method for preparing the trimetaphosphates of trivalent species such as iron and chromium. A phosphate compound such as ammonium phosphate is mixed with a compound which comprises an oxygen-containing anion and a cation of an element that has a trivalent ionic species. The mixture is subjected to a single treatment at elevated temperatures to yield the trimetaphosphate.

4. Description of the Preferred Embodiment

An oxygen-containing compound comprising an element having cationic species capable of reacting with a phosphate compound to form a trimetaphosphate is mixed with a suitable phosphate compound. Useful elements are those wherein the trivalent cation has an ionic radius of at least 0.5 Angstroms. The anion may be simple oxide or an oxygen-containing species such as hydroxide. Preferred compounds include metal oxides such as iron oxides, $Fe_2O_3$ and $Fe_3O_4$, and chromium oxides, $CrO_3$ and $Cr_2O_3$. The phosphate compound is preferably ammonium phosphate, which may be monobasic or dibasic. Both the metal oxides and the phosphate are preferably in powder form.

The metal oxide and ammonium phosphate are mixed together thoroughly, preferably in approximately stoichiometric quantities. Although the dry powders are preferred, the materials may also be combined in an aqueous slurry or even in solution. However, a major advantage of the present invention is the use of dry powder reactants. The blended reactants are then subjected to a single elevated temperature treatment. Heating at a temperature of about 630° to 640° C. is most preferred, in order to keep the heat treatment time relatively short. With masses of reactants in the ranges illustrated by the following examples, about 25 minutes is generally sufficient for forming the iron trimetaphosphate, while about 45 minutes is typically required for the chromium trimetaphosphate. At a given treatment temperature, larger batches will require longer treatment times. The resultant product may be analyzed by X-ray diffraction to determine the yield of the metal trimetaphosphate.

The present invention will be further understood from the descriptions of specific examples which follow.

EXAMPLE I

A dry powder composition comprising 39.9 grams of ferric oxide and 172.5 grams of monobasic ammonium phosphate is ball milled for about two hours. The mixture is then heated at a temperature of 634° C. for about 25 minutes. The resultant product comprises about 70 percent of the C-form of iron trimetaphosphate, as determined by X-ray diffraction patterns.

EXAMPLE II

A mixture of dry powders is prepared containing 39.9 grams of ferric oxide and 172.5 grams of monobasic ammonium phosphate. The powders are thoroughly mixed by hand before heating. The mixture is heated at a temperature of 636° C. for about 25 minutes. X-ray diffraction analysis indicates that the product contains more than 90 percent of the C-form of iron trimetaphosphate. The remainder comprises unidentified crystalline species.

EXAMPLE III

A composition is prepared by combining 38 grams of chromic oxide and 198 grams of dibasic ammonium phosphate. The powders are blended thoroughly and then heated at a temperature of 634° C. for about 45 minutes. The resultant product is identified as the B-form of chromium trimetaphosphate, which has an X-ray diffraction pattern similar to that of the B-form of aluminum trimetaphosphate, rather than the pattern characteristic of hexagonal $Cr(PO_3)_3$.

The above examples are offered to illustrate the present invention. Various heat treatment times and temperatures, which may vary with batch size, are included within the scope of the invention. Other phosphates, as well as other oxygen-containing compounds, such as hydroxides, are also included within the scope of the present invention, which is defined by the following claims.

We claim:

1. A method for making trimetaphosphates comprising the steps of:
   a. mixing thoroughly in approximately stoichiometric quantities
      (1) an oxygen-containing compound of a trivalent element selected from the group consisting of iron and chromium capable of reacting with a phosphate compound to form a trimetaphosphate; and
      (2) a basic phosphate compound capable of reacting with said compound to form a trimetaphosphate; and
   b. heating the mixture at a sufficient temperature for a sufficient time to convert the reactants to a product which comprises a trimetaphosphate of said element.

2. The method according to claim 1, wherein the oxygen-containing compound of an element which has a trivalent species is selected from the group consisting of iron oxide and chromium oxide.

3. The method according to claim 2, wherein the phosphate compound is ammonium phosphate.

4. The method according to claim 3, wherein the iron oxide or chromium oxide and ammonium phosphate are mixed together in dry powder form.

5. The method according to claim 4, wherein the mixture is heated at a temperature above about 500° C.

6. The method according to claim 5, wherein the mixture is heated at a temperature between 630° and 640° C. for a period not longer than one hour.

* * * * *